US012638180B1

(12) United States Patent
Weaver et al.

(10) Patent No.: US 12,638,180 B1
(45) Date of Patent: May 26, 2026

(54) COMBUSTOR INLET PLENUM AND BAFFLE

(71) Applicant: PRATT & WHITNEY CANADA CORP., Longueuil (CA)

(72) Inventors: Paul Weaver, Chateauguay (CA); Michel Desjardins, Saint-Hubert (CA); Guillaume Landry-Drolet, Boucherville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/217,502

(22) Filed: May 23, 2025

(51) Int. Cl.
  *F23R 3/02* (2006.01)
  *F02C 7/10* (2006.01)
  *F02C 7/14* (2006.01)
  *F04D 29/44* (2006.01)
  *F23R 3/04* (2006.01)

(52) U.S. Cl.
  CPC .................. *F23R 3/02* (2013.01); *F02C 7/10* (2013.01); *F02C 7/14* (2013.01); *F04D 29/441* (2013.01); *F23R 3/04* (2013.01); *F05D 2260/213* (2013.01)

(58) Field of Classification Search
  CPC .... F04D 29/441; F04D 29/442; F04D 29/444; F04D 29/541; F04D 29/542; F04D 29/544; F04D 29/545; F04D 29/547; F23R 3/002; F23R 3/02; F23R 3/04; F23R 3/10; F23R 3/16; F23R 3/26; F23R 3/06; F23R 2900/03041–03045; F02C 7/08–105
  See application file for complete search history.

(56) References Cited

U.S. PATENT DOCUMENTS

| | | | | |
|---|---|---|---|---|
| 3,742,702 | A * | 7/1973 | Quinn | F23R 3/04 60/39.23 |
| 4,085,579 | A * | 4/1978 | Holzapfel | F23R 3/26 60/39.23 |
| 4,339,925 | A | 7/1982 | Eggmann et al. | |
| 4,429,527 | A | 2/1984 | Teets | |
| 6,305,172 | B1 | 10/2001 | Kim | |
| 9,752,585 | B2 * | 9/2017 | Kupratis | F04D 17/12 |
| 11,215,364 | B2 * | 1/2022 | Miyamoto | F23R 3/283 |
| 11,333,173 | B2 * | 5/2022 | Nichols | F04D 29/5826 |
| 11,959,401 | B1 * | 4/2024 | Nasir | F02C 3/04 |

(Continued)

FOREIGN PATENT DOCUMENTS

FR        3138830 A1      2/2024

OTHER PUBLICATIONS

Editorial by Industrial Quick Search, Heat Exchangers, Oct. 31, 2023, retrieved from Wayback Machine Archive, https://web.archive.org/web/20231031060140/https://www.iqsdirectory.com/articles/heat-exchanger.html (Year: 2023).*

(Continued)

*Primary Examiner* — Stephanie Sebasco Cheng
(74) *Attorney, Agent, or Firm* — Kinney & Lange, P.A.

(57)        ABSTRACT

An inlet plenum for a gas turbine engine combustor includes first and second inlet ducts fluidly connected to a distribution duct. The distribution duct extends circumferentially about an axis to fluidly connect the inlet ducts to an outlet at a radially inner boundary. The first and second inlet ducts fluidly communicate with a compressor of the gas turbine engine. A radially inner boundary of the distribution duct fluidly communicates with a combustor plenum of the gas turbine engine.

20 Claims, 4 Drawing Sheets

(56) References Cited

U.S. PATENT DOCUMENTS

| 11,988,112 | B2 | | 5/2024 | Pons et al. |
| 12,286,926 | B2 * | | 4/2025 | Pons ...................... F04D 25/04 |
| 2014/0318151 | A1 | | 10/2014 | Honnorat et al. |
| 2023/0220800 | A1 | | 7/2023 | Pons et al. |

OTHER PUBLICATIONS

Wikipedia, Monotonic Function, Dec. 23, 2023, retrieved from Wayback Machine Archive, https://web.archive.org/web/20231223205637/https://en.wikipedia.org/wiki/Monotonic_function (Year: 2023).*

* cited by examiner

COMBUSTOR INLET PLENUM AND BAFFLE

BACKGROUND

The present disclosure relates to gas turbine engines and more particularly, to ducting for introducing compressor air flow into a combustor plenum.

Combustor performance for gas turbine engines is affected by the uniformity of compressed gas entering the combustor plenum. Certain gas turbine engines have components and/or architectures that introduce swirl into the combustor plenum and/or include asymmetric supply of compressed gas into the combustor plenum. Past attempts to address uniformity within the combustor plenum include radial diffusers and axial diffusers. While these solutions are considered satisfactory for their intended purpose, further development of combustor plenum is needed to further improve combustor performance generally and, more particularly, for recuperative gas turbine engine architectures.

SUMMARY

An inlet plenum according to an example of this disclosure includes a first inlet duct, a second inlet duct, a distribution duct, and a perforated plate. The first inlet duct extends from a first inlet to the distribution duct. The second inlet duct extends from a second inlet to the distribution duct. The distribution duct extends circumferentially about an axis and fluidly communicates with the first inlet duct and the second inlet duct. Apertures extend through the perforated plate, which forms a radially inner boundary of the distribution duct.

A gas turbine engine according to another example of this disclosure includes a compressor, a combustor shell, a casing, and an inlet plenum. The inlet plenum includes a first inlet duct, a second inlet duct, a distribution duct, and a perforated plate. The first inlet duct extends from a first inlet to the distribution duct. The second inlet duct extends from a second inlet to the distribution duct. The distribution duct extends circumferentially about an axis and fluidly communicates with the first inlet duct and the second inlet duct. Apertures extend through the perforated plate, which forms a radially inner boundary of the distribution duct. The first inlet duct and the second inlet duct fluidly communicate with the compressor at the first inlet and the second inlet. A radially inner boundary of the distribution duct fluidly communicates with the combustor plenum.

DETAILED DESCRIPTION

Figure 1:
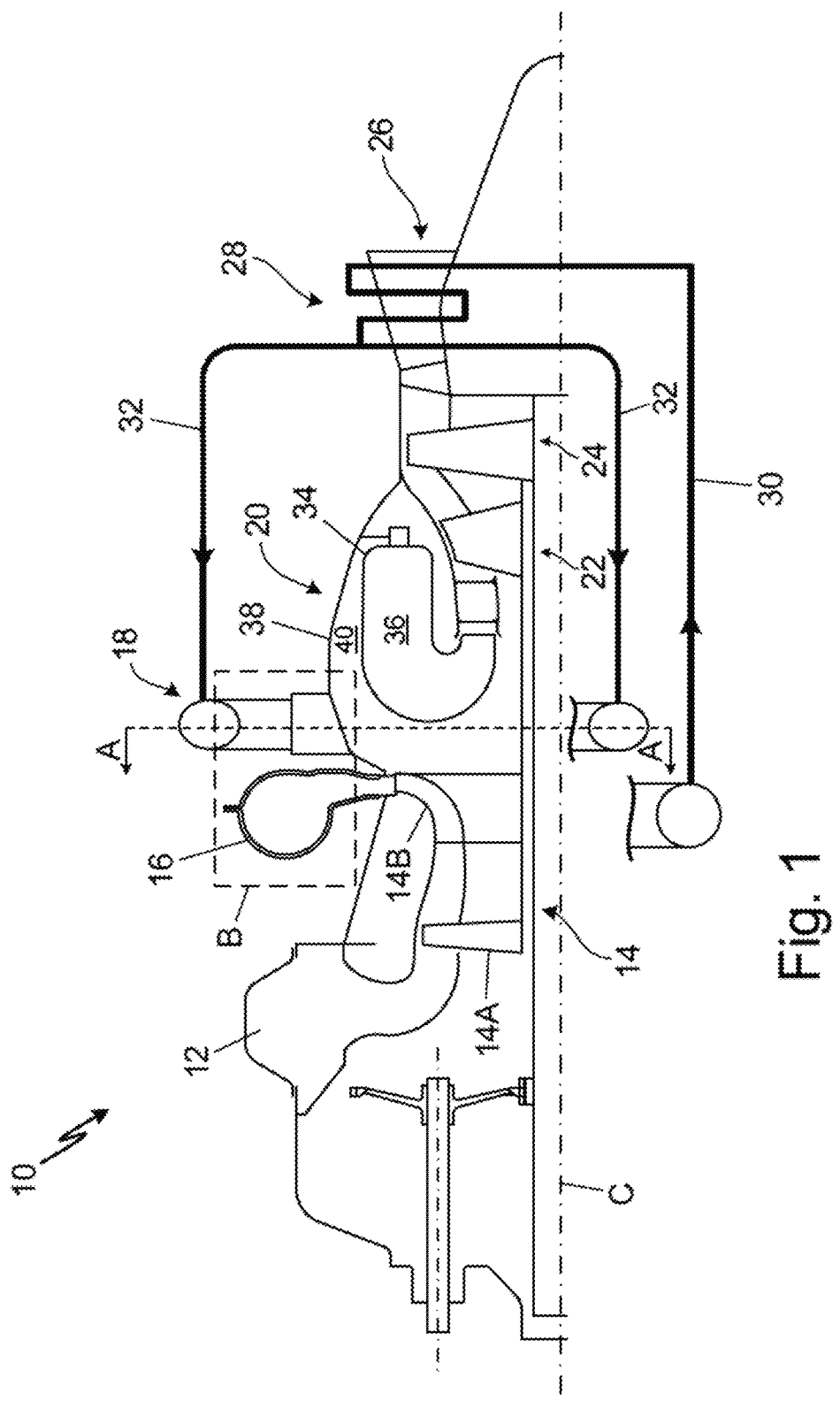
FIG. 1 is a schematic cross-sectional view of an example gas turbine engine with an inlet plenum.

FIG. 1 is a schematic cross-sectional view of gas turbine engine 10, which is depicted with a turboshaft architecture that includes a gas generator and a power turbine. In other examples, gas turbine engine 10 can be configured with a single spool architecture, a dual spool architecture, or more than two spools (e.g., a topping cycle spool non-concentrically arranged with respect to one or more primary spools). Gas turbine engine 10 can be configured as a propulsion engine, for example, a turbofan engine and/or a turboprop engine rather than the depicted turboshaft configuration. In other examples, gas turbine engine 10 can be an industrial gas turbine engine driving a load (e.g., an electric machine). The architecture of gas turbine engine 10 depicts a forward-to-aft main gas flow path in which the engine ingests air into a forward portion of the engine that flows aft through the compressor section, the combustor, and the turbine section before discharging from an aft portion of the engine. In other examples, gas turbine engine 10 can have a reverse-flow architecture in which the engine ingests air into an aft portion of the engine that flows forward through the compressor section, the combustor, and the turbine section before discharging through an exhaust at a forward portion of the engine. Each compressor and/or turbine section can have one or more stages. Each stage can include at least one rotor of circumferentially spaced blades and at least one stator of circumferentially spaced and stationary vanes. As depicted, gas turbine engine 10 includes multiple compressor stages and multiple turbine stages. However, other examples of gas turbine engine 10 can have more stages or less stages than the number of compressor stages and/or turbine stages depicted by FIG. 1.

As depicted in FIG. 1, gas turbine engine 10 includes, in serial flow communication, air inlet 12, compressor section 14, compressor discharge duct 16, inlet plenum 18, combustor 20, turbine section 22, power turbine 24, and exhaust section 26. Compressor section 14 pressurizes air entering gas turbine engine 10 through air inlet 12 using axial compressor stage 14A and radial compressor stage 14B. The pressurized air discharged from compressor section 14 enters compressor discharge duct 16 and inlet plenum 18 before mixing with fuel inside combustor 20. Igniters initiate combustion of the air-fuel mixture within combustor 20, which is sustained by a continuous supply of fuel and pressurized air and/or igniter activation. A heated and compressed air stream discharges through turbine section 22, power turbine 24, and exhaust section 26. Turbine section 22 extracts energy from the exhaust stream to drive compressor section 14 and other engine accessories such as electrical generators and pumps for lubrication, fuel, and/or actuators.

In certain examples, gas turbine engine 10 can be configured with a recuperative gas turbine engine architecture that includes heat exchanger 28 in a heat exchange relationship with the exhaust stream downstream from turbine section 22 and discharged through exhaust section 26. Heat exchanger 28 receives compressed air from compressor discharge duct 16 via supply line 30, and preheats the compressed air stream using heat transferred from the exhaust stream. A heated and compressed air stream discharges from heat exchanger 28 to inlet plenum 18 via return lines 32. By preheating the compressed air stream, the compressed air stream enters combustor 20 at a higher temperature relative to a gas turbine engine 10 without heat exchanger 28. Accordingly, gas turbine engine 10 with a recuperative gas turbine engine architecture can achieve a target power level using less fuel, increasing the efficiency of gas turbine engine 10.

Since the compressed air stream discharged from compressor section 14 is diverted from a convention axial flow direction to heat exchanger 28 via compressor discharge duct 16, the heated compressed air stream is reintroduced into combustor 20 by inlet plenum 18. Combustor 20 includes combustor shell 34, which bounds an annular combustion chamber 36. Casing 38 surrounds combustor shell 34 to form plenum 40. As received by inlet plenum 18, the compressed air stream flow direction is in majority normal to the inlet 46A, 46B, and is then distributed circumferentially into plenum 40 of combustor 20 along a flow direction normal to an outlet area of inlet plenum 18. Inlet plenum 18 reduces variance of velocity and pressure distributions of the heated compressed air flow stream discharged into plenum 40 and thereby improves uniformity and stability of combustion within combustor 20.

Figure 2:
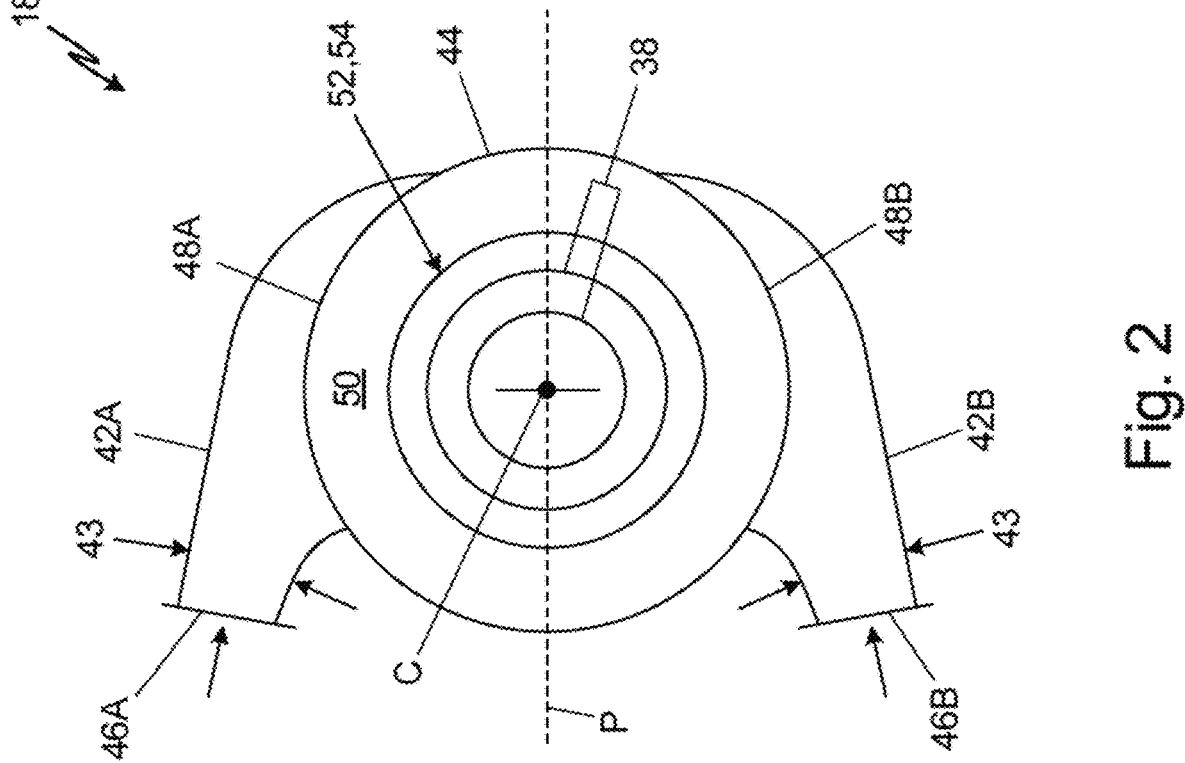
FIG. 2 is a cross-sectional view of an example inlet plenum taken along line A-A.
Figure 3:
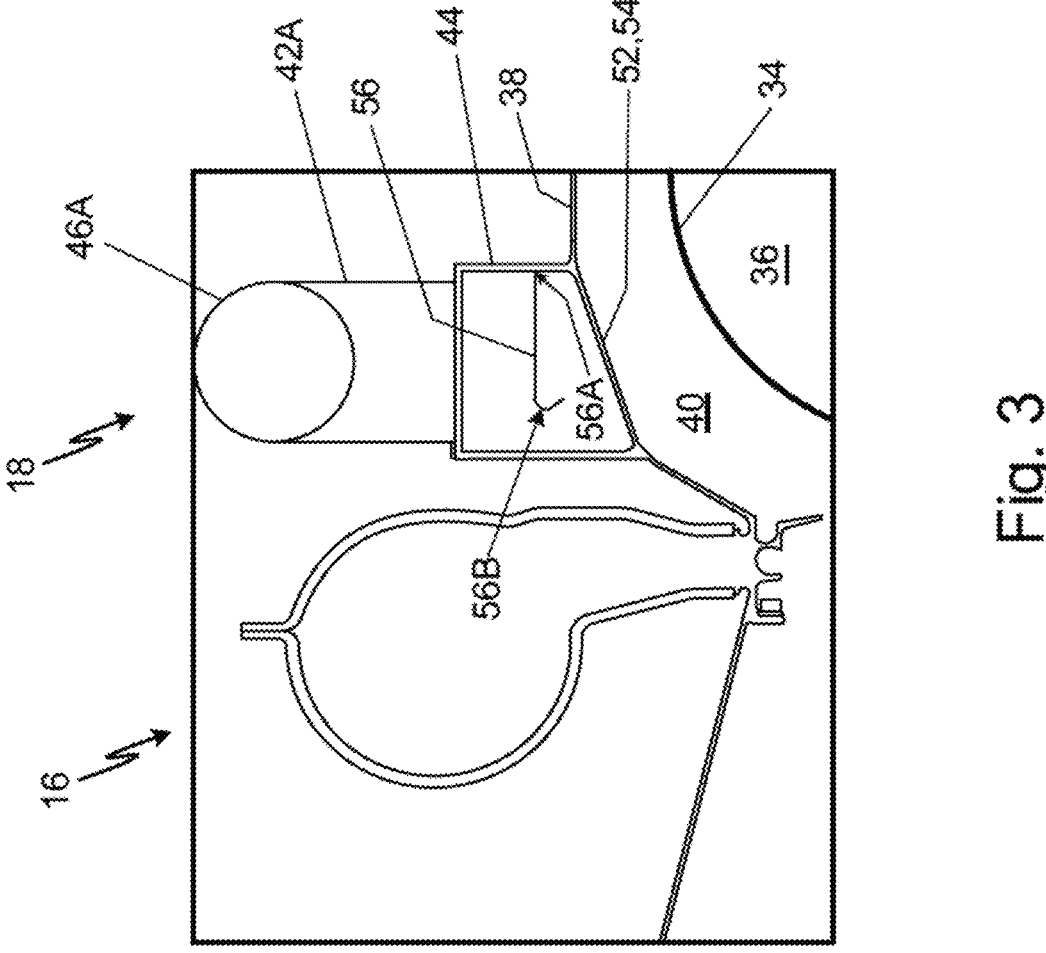
FIG. 3 is an enlarged view of region B in FIG. 1 that depicts an example baffle.

FIG. 2 is a cross-sectional view taken along line A-A in FIG. 1 that depicts a schematic example of inlet plenum 18. FIG. 3 is an enlarged view of the cross-section of FIG. 1 depicted inlet plenum 18 is greater detail along with additional optional features of inlet plenum 18. FIG. 2 and FIG. 3 are discussed together below.

Inlet plenum 18 includes inlet ducts 42A-42B and distribution duct 44. Inlet ducts 42A-42B extend from respective inlets 46A-46B to intersect a radially outer wall of distribution duct 44 at respective openings 48A-48B. Distribution duct 44 extends circumferentially about axis C to enclose annular cavity 50. A radially inner boundary of distribution duct 44 forms outlet 52 of inlet plenum 18. Collectively, inlet plenum 18 forms a flow path from inlets 46A-46B through inlet ducts 42A-42B to distribution duct 44. The flow path extends circumferentially about axis through distribution duct 44 before exiting through outlet 52.

In some examples, openings can be equally spaced circumferentially about axis C to promote flow uniformity within annular cavity 50. In certain examples, inlet ducts 42A-42B can be arranged with opposing circumferential orientations such that flow entering distribution duct 44 flows in opposite circumferential directions through annular cavity 50. That is to say the flow path direction from inlet 46A to opening 48A of first inlet duct 42A defines a circumferential orientation (e.g., clockwise direction as viewed in FIG. 2) that is opposite the circumferential orientation defined by the flow path direction from inlet 46B to opening 48B of second inlet duct 42B (e.g., a counter-clockwise direction as view in FIG. 2).

Inlet ducts 42A-42B are spaced circumferentially about axis A to interface with distribution duct 44. As shown in FIG. 2, inlet plenum 18 can include plane P, which is a fictitious plane (i.e., an imaginary plane) that extends through axis A to separate inlet plenum 18 into first side 18A and second side 18B. In such examples inlet duct 42A can be disposed on first side 18A, and inlet duct 42B can be disposed on second side 18B, placing inlet ducts 42A-42B on opposite sides of plane P. In some of these examples, inlet ducts 42A-42B can be positioned such that inlet plenum 18 is symmetric about plane P as shown in FIG. 2.

Further, inlet ducts 42A-42B can include monotonically increasing cross-sectional flow areas from each of inlets 46A-46B towards distribution duct 44. In some examples, the circumferential walls of inlet ducts 42A-42B diverge. An included angle between the circumferential walls (i.e., angle 43) proximate inlets 46A-46B can be greater than zero degrees and less than or equal to ten degrees in certain examples, which discourages flow detachment from walls of inlet ducts 42A-42B and hence promotes flow uniformity within distribution duct 44. To form a smooth transition between inlet ducts 42A-42B and distribution duct 44, the circumferential walls of inlet ducts 42A-42B can be curved to join corresponding walls of distribution duct 44.

Walls of distribution duct 44 enclose annular cavity 50. In some examples, distribution duct 44 extends entirely around axis C to form a continuous annular cavity 50. Distribution duct 44 can include side walls joined by an outer wall to form a C-shaped shell in cross-section, which includes an open radially inner boundary. Side walls in either example can be attached to or joined to casing 38 as shown in FIG. 3.

In certain examples, radially inner boundary of distribution duct 44 is bound by perforated plate 54, which includes a distribution of apertures that define outlet 52 of inlet plenum 18. Perforated plate 54 meters flow into plenum 40, further promoting flow uniformity within distribution duct 44 and consequently within plenum 40 of combustor 20.

In some examples, inlet plenum 18 can include baffle 56 disposed within annular cavity 50, dividing annular cavity 50 into a radially outer region and a radially inner region as shown in FIG. 3. Baffle 56 extends axially along axis C from a fixed proximal end 56A to a cantilevered distal end 56B. Proximal end 56A attaches to or is joined with one of side walls of distribution duct 44. An axial extent of baffle 56 measured parallel to axis C is less than an axial extent of annular cavity 50 such that baffle 56 does not completely obstruct flow from a radial outer region to a radial inner region of annular cavity 50. Distal end 56B of baffle 56 can be contoured to form a rounded end to avoid or reduce detachment of flow rounding distal end 56B of baffle 56. Examples of inlet plenum 18 with baffle may further improve flow uniformity within distribution duct 44 and, hence, improve flow uniformity within plenum 40 of combustor 20.

Figure 4:
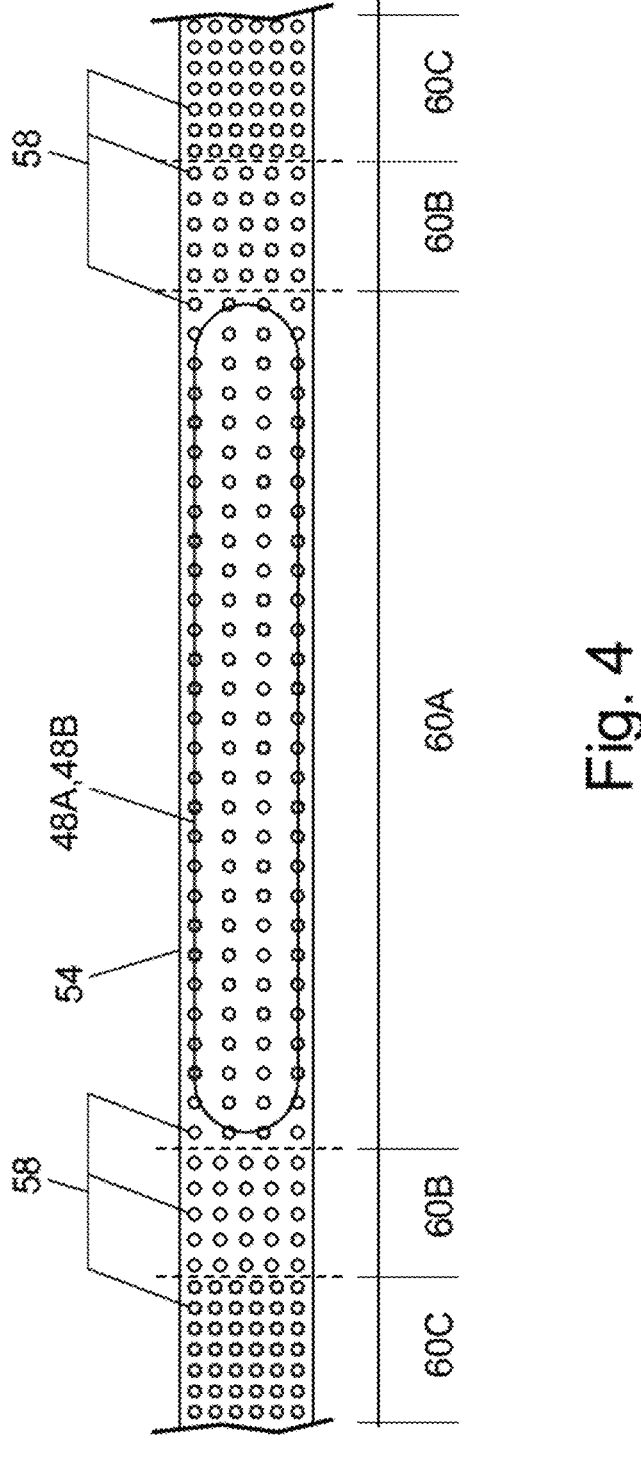
FIG. 4 is a developed view of a perforated plate that can form an outlet of the inlet plenum.

FIG. 4 is a developed view of one half of perforated plate 54, which can form an outlet of inlet plenum 18 fluidly connecting distribution duct 44 with plenum 40 of combustor 20. Perforated plate 54 includes a distribution of apertures 58 depicted in relation to one or openings 48A-48B. Apertures 58 extend through perforated plate 54 to define an open area extending therethrough. Apertures 58 can be arranged and/or sized to provide an increasing open area in proportion to a distance from geometric center C of one of openings 48A-48B.

The distribution of apertures 58 has increasing open area per unit area (i.e., open area density) with increasing circumferential distance from one of openings 48A-48B, which can be defined relative to geometric center C. In the depicted example, apertures 58 are arranged in three zones 60A, 60B, and 60C, each zone having a different open area. Zone 60A coincides with one of openings 48A-48B. Zones 60B are circumferentially adjacent to zone 60A while zones 60C are circumferentially adjacent to zones B. Apertures 58 within each of zones 60B define an open area that is greater than an open area in zone 60A while apertures 58 within each of zones 60C define an open area that is greater than an open area in each of zones 60B. In each of zones 60A, 60B, and 60C, the sizes of apertures 58 are the same, the increasing open area distribution achieved by increasing the number of apertures per unit area. In other examples, the shape and size of apertures 58 can be varied to achieve a target open area, or the size and number of apertures 58 can be varied to achieve the targe open area.

Discussion of Possible Embodiments

The following are non-exclusive descriptions of possible embodiments of the present invention.

Inlet Plenum for a Gas Turbine Engine Combustor

An inlet plenum according to an example embodiment of this disclosure, among other possible things, includes a first inlet duct, a second inlet duct, and a distribution duct. The first inlet duct extends from a first inlet to the distribution duct. The second inlet duct extends from a second inlet to the distribution duct. The distribution duct extends circumferentially about an axis and fluidly communicates with the first inlet duct at a first opening and the second inlet duct at a second opening.

The inlet plenum of the preceding paragraph can optionally include, additionally and/or alternatively, any one or more of the following features, configurations and/or additional components.

A further embodiment of the foregoing inlet plenum, wherein the inlet plenum can include a first side and a second side separated by a fictitious plane that extends through the axis.

A further embodiment of any of the foregoing inlet plenums, wherein the first inlet duct can be disposed on the first side of the inlet plenum.

A further embodiment of any of the foregoing inlet plenums, wherein the second inlet duct can be disposed on the second side of the inlet plenum.

A further embodiment of any of the foregoing inlet plenums, wherein the first inlet duct can have a monotonically increasing cross-sectional flow area from the first inlet to distribution duct.

A further embodiment of any of the foregoing inlet plenums, wherein the second inlet duct can have a monotonically increasing cross-sectional flow area from the second inlet to the distribution duct.

A further embodiment of any of the foregoing inlet plenums can further include a perforated plate forming a radially inner boundary of the distribution duct.

A further embodiment of any of the foregoing inlet plenums, wherein a distribution of apertures extends through the perforated plate.

A further embodiment of any of the foregoing inlet plenums, wherein the plurality of apertures can have a distribution with increasing open area per unit circumference from the first inlet duct to the fictitious plane.

A further embodiment of any of the foregoing inlet plenums, wherein the plurality of apertures can have a distribution with increasing open area per unit circumference from the second inlet duct to the fictitious plane.

A further embodiment of any of the foregoing inlet plenums can include a baffle extending within the distribution duct to divide a radially outer region from a radially inner region of the distribution duct.

A further embodiment of any of the foregoing inlet plenums, wherein an axial extent of the baffle is less than an axial extent of the interior of the distribution duct.

A further embodiment of any of the foregoing inlet plenums, wherein the baffle can include a proximal end connected to the distribution duct and a distal end cantilevered within the distribution duct.

A further embodiment of any of the foregoing inlet plenums, wherein the distal end of the baffle can have a rounded bend.

A further embodiment of any of the foregoing inlet plenums, wherein the inlet plenum can be symmetric about the fictitious plane equidistant between the first inlet duct and the second inlet duct.

A further embodiment of any of the foregoing inlet plenums, wherein the first inlet duct can extend from the first inlet duct to the first opening to define a first circumferential direction about the axis.

A further embodiment of any of the foregoing inlet plenums, wherein the second inlet duct can extend from the second inlet to the second opening to define a second circumferential direction about the axis.

A further embodiment of any of the foregoing inlet plenums, wherein the second circumferential direction can be opposite the first circumferential direction.

A Gas Turbine Engine with an Inlet Plenum

A gas turbine engine according to an example embodiment of this disclosure includes, among other possible things, a compressor, a combustor shell, a casing, and an inlet plenum. The combustor shell bounds an annular combustion chamber. The casing circumscribes the combustor shell to define a plenum. The inlet plenum includes a first inlet duct, a second inlet duct, and a distribution duct. The first inlet duct extends from a first inlet to the distribution duct. The second inlet duct extends from a second inlet to the distribution duct. The distribution duct extends circumferentially about an axis and fluidly communicates with the first inlet duct at a first opening and the second inlet duct at a second opening.

The gas turbine engine of the preceding paragraph can optionally include, additionally and/or alternatively, any one or more of the following features, configurations and/or additional components.

A further embodiment of the foregoing gas turbine engine can further include a heat exchanger in thermal communication with an exhaust stream of the gas turbine engine.

A further embodiment of any of the foregoing gas turbine engines, wherein a cold side of the heat exchanger can be fluidly connected to the compressor.

A further embodiment of any of the foregoing gas turbine engines, wherein a hot side of the heat exchanger can be fluidly connected to the inlet plenum at the first inlet and the second inlet.

A further embodiment of any of the foregoing gas turbine engines can further include a compressor discharge duct in fluid communication with the compressor and the cold side of the heat exchanger.

A further embodiment of any of the foregoing gas turbine engines, wherein the inlet plenum can include a first side and a second side separated by a fictitious plane that extends through the axis.

A further embodiment of any of the foregoing gas turbine engines, wherein the first inlet duct can be disposed on the first side of the inlet plenum.

A further embodiment of any of the foregoing gas turbine engines, wherein the second inlet duct can be disposed on the second side of the inlet plenum.

A further embodiment of any of the foregoing gas turbine engines, wherein the first inlet duct can have a monotonically increasing cross-sectional flow area from the first inlet to distribution duct.

A further embodiment of any of the foregoing gas turbine engines, wherein the second inlet duct can have a monotonically increasing cross-sectional flow area from the second inlet to the distribution duct.

A further embodiment of any of the foregoing gas turbine engines can have a perforated plate at the radially inner boundary of the distribution duct.

A further embodiment of any of the foregoing gas turbine engines, wherein a plurality of apertures can extend through the perforated plate.

A further embodiment of any of the foregoing gas turbine engines, wherein the plurality of apertures can have a distribution with increasing open area density with increasing circumferential distance from the first inlet duct towards the fictitious plane.

A further embodiment of any of the foregoing gas turbine engines, wherein the plurality of apertures can have a distribution with increasing open area density with increasing circumferential distance from the second inlet duct towards the fictious plane.

A further embodiment of any of the foregoing gas turbine engines can further include a baffle extending within the distribution duct to divide a radially outer region from a radially inner region of the distribution duct.

A further embodiment of any of the foregoing gas turbine engines, wherein an axial extent of the baffle is less than an axial extent of the interior of the distribution duct.

A further embodiment of any of the foregoing gas turbine engines, wherein the baffle can include a proximal end connected to the distribution duct and a distal end cantilevered within the distribution duct.

A further embodiment of any of the foregoing gas turbine engines, wherein the distal end of the baffle can have a rounded bend.

A further embodiment of any of the foregoing gas turbine engines, wherein the inlet plenum can be symmetric about the fictitious plane equidistant between the first inlet duct and the second inlet duct.

A further embodiment of any of the foregoing gas turbine engines, wherein the first inlet duct can extend from the first inlet duct to the first opening to define a first circumferential direction about the axis.

A further embodiment of any of the foregoing gas turbine engines, wherein the second inlet duct can extend from the second inlet to the second opening to define a second circumferential direction about the axis.

A further embodiment of any of the foregoing gas turbine engines, wherein the second circumferential direction can be opposite the first circumferential direction.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An inlet plenum for a combustor comprising:
a first inlet duct extending from a first inlet;
a second inlet duct extending from a second inlet; and
a distribution duct extending circumferentially about an axis and fluidly communicating with the first inlet duct at a first opening and the second inlet duct at a second opening, each of the first inlet duct, the second inlet duct, and the distribution duct located at the same axial position along the axis, and each of the first inlet duct and the second inlet duct extending in a circumferential direction about the axis and extending in a radially inward direction with respect to the axis,
wherein the inlet plenum includes a first side and a second side separated by a fictitious plane that contains the axis, and wherein the first inlet duct is disposed on the first side and the second inlet duct is disposed on the second side, and
wherein the first inlet duct is circumferentially spaced from the second inlet duct about the axis.

2. An inlet plenum for a combustor comprising:
a first inlet duct extending from a first inlet;
a second inlet duct extending from a second inlet;

a distribution duct extending circumferentially about an axis and fluidly communicating with the first inlet duct at a first opening and the second inlet duct at a second opening, each of the first inlet duct and the second inlet duct extending in a circumferential direction about the axis and extending in a radially inward direction with respect to the axis; and
a perforated plate forming a radially inner boundary of the distribution duct, wherein a plurality of apertures extends through the perforated plate
wherein the first inlet duct, the second inlet duct, and the distribution duct are located at the same axial position coincident along the axis, and
wherein the first inlet duct is circumferentially spaced from the second inlet duct about the axis.

3. The inlet plenum of claim 2, wherein the first inlet duct has a monotonically increasing cross-sectional flow area from the first inlet to the distribution duct, and wherein the second inlet duct has a monotonically increasing cross-sectional flow area from the second inlet to the distribution duct.

4. The inlet plenum of claim 2, wherein the inlet plenum includes a first side and a second side separated by a fictitious plane that contains the axis, and wherein the first inlet duct is disposed on the first side and the second inlet duct is disposed on the second side.

5. The inlet plenum of claim 4, wherein the plurality of apertures has a distribution with increasing open area density with increasing circumferential distance from the first opening to the fictitious plane, and with increasing open area density with increasing circumferential distance from the second opening to the fictitious plane.

6. The inlet plenum of claim 2, further comprising
a baffle extending within the distribution duct to divide a radially outer region from a radially inner region of the distribution duct, wherein an axial extent of the baffle is less than an axial extent of the interior of the distribution duct.

7. The inlet plenum of claim 6, wherein the baffle includes a proximal end connected to the distribution duct and a distal end cantilevered within the distribution duct.

8. The inlet plenum of claim 7, wherein the distal end of the baffle has a rounded bend.

9. The inlet plenum of claim 2, wherein the first inlet duct extends from the first inlet to the first opening to define a first circumferential direction about the axis, and wherein the second inlet duct extends from the second inlet to the second opening to define a second circumferential direction about the axis that is opposite the first circumferential direction.

10. A gas turbine engine comprising:
a compressor;
a combustor shell bounding an annular combustion chamber;
a casing circumscribing the combustor shell to define a combustor plenum; and
an inlet plenum fluidly connected to the combustor plenum comprising:
a first inlet duct extending from a first inlet;
a second inlet duct extending from a second;
a distribution duct extending circumferentially about an axis and fluidly communicating with the first inlet at a first opening and the second inlet duct at a second opening, each of the first inlet duct, the second inlet duct, and the distribution duct located at the same axial position along the axis, and each of the first inlet duct and the second inlet duct extending in a circumferential direction about the axis and extending in a radially inward direction with respect to the axis; and a perforated plate forming a radially inner boundary of the distribution duct, wherein a plurality of apertures extends through the perforate plate;

wherein the first inlet duct and the second inlet duct fluidly communicate with the compressor at the first inlet and the second inlet, wherein the radially inner boundary of the distribution duct fluidly communicates with the combustor plenum, and wherein the first inlet duct is circumferentially spaced from the second inlet duct about the axis.

11. The gas turbine engine of claim 10, further comprising:

a heat exchanger in thermal communication with an exhaust stream of the gas turbine engine, wherein the heat exchanger is fluidly connected to the compressor, and wherein the heat exchanger is fluidly connected to the inlet plenum at the first inlet and the second inlet.

12. The gas turbine engine of claim 11, further comprising: a compressor discharge duct in fluid communication between the compressor and the heat exchanger.

13. The gas turbine engine of claim 10, wherein the first inlet duct has a monotonically increasing cross-sectional flow area from the first inlet to the distribution duct.

14. The gas turbine engine of claim 13, wherein the second inlet duct has a monotonically increasing cross-sectional flow area from the second inlet to the distribution duct.

15. The gas turbine engine of claim 10, wherein the inlet plenum includes a first side and a second side separated by a fictitious plane that contains the axis, and wherein the first inlet duct is disposed on the first side and the second inlet duct is disposed on the second side.

16. The gas turbine engine of claim 15, wherein the plurality of apertures has a distribution with increasing open area density with increasing circumferential distance from the first opening towards the fictitious plane, and with increasing open area density with increasing circumferential distance from the second opening towards the fictitious plane.

17. The gas turbine engine of claim 10, further comprising a baffle extending within the distribution duct to divide a radially outer region from a radially inner region of the distribution duct, wherein an axial extent of the baffle is less than an axial extent of the interior of the distribution duct.

18. The gas turbine engine of claim 17, wherein the baffle includes a proximal end connected to the distribution duct and a distal end cantilevered within the distribution duct.

19. The gas turbine engine of claim 18, wherein the distal end of the baffle has a rounded bend.

20. The gas turbine engine of claim 10, wherein the first inlet duct extends from the first inlet to the first opening to define a first circumferential direction about the axis, and wherein the second inlet duct extends from the second inlet to the second opening to define a second circumferential direction about the axis that is opposite the first circumferential direction.

* * * * *